US012786526B2

(12) United States Patent
Gupta et al.

(10) Patent No.: US 12,786,526 B2
(45) Date of Patent: Nov. 3, 2026

(54) PERSONALIZED SCREENCAPS FOR TRICKPLAY SLIDER

(71) Applicant: Adeia Guides Inc., San Jose, CA (US)

(72) Inventors: Vikram Makam Gupta, Bangalore (IN); Vishwas Sharadanagar Panchaksharaiah, Tiptur (IN); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/675,554

(22) Filed: May 28, 2024

(65) Prior Publication Data

US 2024/0397170 A1 Nov. 28, 2024

Related U.S. Application Data

(63) Continuation of application No. 18/141,076, filed on Apr. 28, 2023, now Pat. No. 12,022,170, which is a continuation of application No. 17/378,281, filed on Jul. 16, 2021, now Pat. No. 11,678,030.

(51) Int. Cl.

| | |
|---|---|
| ***H04N 21/8549*** | (2011.01) |
| ***G06V 20/40*** | (2022.01) |
| ***H04N 21/431*** | (2011.01) |
| ***H04N 21/44*** | (2011.01) |
| ***H04N 21/45*** | (2011.01) |
| ***H04N 21/472*** | (2011.01) |

(52) U.S. Cl.

CPC ......... *H04N 21/8549* (2013.01); *G06V 20/46* (2022.01); *H04N 21/4316* (2013.01); *H04N 21/44008* (2013.01); *H04N 21/4532* (2013.01); *H04N 21/47217* (2013.01); *G06V 2201/10* (2022.01)

(58) Field of Classification Search

CPC ........... H04N 21/8549; H04N 21/4316; H04N 21/44008; H04N 21/4532; H04N 21/47217; G06V 20/46; G06V 2201/10

See application file for complete search history.

(56) References Cited

U.S. PATENT DOCUMENTS

| | | | | |
|---|---|---|---|---|
| 7,962,942 B1 | 6/2011 | Craner | | |
| 9,088,827 B2 | 7/2015 | Craner | | |
| 9,271,042 B2 | 2/2016 | Craner | | |
| 10,057,655 B2 | 8/2018 | Craner | | |
| 11,109,113 B2 | 8/2021 | Craner | | |
| 11,678,030 B2 | 6/2023 | Gupta et al. | | |
| 12,022,170 B2 | 6/2024 | Gupta et al. | | |
| 2009/0158326 A1 * | 6/2009 | Hunt | ...................... | H04N 5/783 725/38 |

(Continued)

*Primary Examiner* — Thai Q Tran
*Assistant Examiner* — Jose M Mesa
(74) *Attorney, Agent, or Firm* — HG LAW LLP

(57) ABSTRACT

Systems and methods are provided for displaying personalized preview images during trick-play operations of a media asset based on user profile data and an importance of frames of the media asset. A request from a user to move a slider of a progress bar associated with a media asset is received while the media asset is being generated for display. A scene from the media asset that contains a play position indicated by the slider is identified and a frame that best matches user profile data of the user and importance data for the scene is identified. The identified frame is generated for display as an overlay over the displayed media asset.

20 Claims, 10 Drawing Sheets

(56) References Cited

U.S. PATENT DOCUMENTS

| | | | | |
|---|---|---|---|---|
| 2012/0084377 | A1 | 4/2012 | Lee et al. | |
| 2013/0185757 | A1 | 7/2013 | Craner | |
| 2015/0161174 | A1* | 6/2015 | Kumar | G06V 10/761 707/769 |
| 2016/0070962 | A1 | 3/2016 | Shetty et al. | |
| 2017/0177577 | A1* | 6/2017 | Sharifi | G06F 16/248 |
| 2019/0208282 | A1* | 7/2019 | Singh | H04N 21/4667 |
| 2020/0128294 | A1* | 4/2020 | Gupta | H04N 21/44222 |
| 2021/0084377 | A1 | 3/2021 | Taylor | |
| 2021/0360331 | A1 | 11/2021 | Craner | |
| 2021/0392278 | A1* | 12/2021 | Zhang | G06V 20/41 |
| 2023/0017489 | A1 | 1/2023 | Gupta et al. | |
| 2023/0269447 | A1 | 8/2023 | Gupta et al. | |

* cited by examiner

PERSONALIZED SCREENCAPS FOR TRICKPLAY SLIDER

CROSS-REFERENCE TO RELATED APPLICATIONS

This application is a continuation of U.S. patent application Ser. No. 18/141,076, filed Apr. 28, 2023, which is a continuation of U.S. patent application Ser. No. 17/378,281, filed Jul. 16, 2021, now U.S. Pat. No. 11,678,030, the disclosures of which are incorporated by reference in their entireties.

BACKGROUND

The present disclosure relates to systems and methods for displaying preview images during trick-play operations, and, more particularly, for displaying personalized preview images during trick-play operations of a media asset based on user profile data and the importance of frames of the media asset.

SUMMARY

Most media players (e.g., including media player applications, media platforms, etc.) provide a variety of trick-play operations to enable users to navigate through media assets. For example, users can fast-forward, rewind, skip through segments, jump to specific chapters, or perform a "scrubbing" interaction when consuming a media asset. Scrubbing is an interaction in which a user drags their finger (e.g., in the case of smartphone devices or the like) or a cursor (e.g., in the case of PCSs or the like) across a segment of the media asset through (e.g., a media player). Media players commonly include a horizontal slider (e.g., a trick-play slider) displayed on a progress bar to enable a user to change the current play position of the media asset being generated for display. In some cases, while the user is dragging the slider, a media player may present previews (e.g., thumbnails) of the media content corresponding to the position of the slider.

Currently, well-defined requirements for displaying previews during trick-play operations are available, e.g., HTTP Live Streaming (HLS), Dynamic Adaptive Streaming over HTTP (DASH), etc. For example, HLS requires content authors to use I-frame playlists for scrubbing. Also, the use of dedicated I-frame renditions such as one frame/second dense I-frame renditions may be recommended, as opposed to using the I-frames from the actual content item, as higher density provides better performance for trick mode. Furthermore, the use of multiple I-frame playlists with different bitrate variants may also be implemented in conventional systems. When a user performs a trick-play operation (e.g., scrubbing), I-frame renditions are displayed based on the position of the slider, the interval of the I-frame renditions, and the speed of the trick-play operation.

However, in this approach, because previews for an I-frame playlist are spaced at predetermined intervals (e.g., one preview/second, one preview/three seconds, one preview/minute) and are not personalized for a particular user or based on the importance of the frame, it may be difficult for a user to quickly navigate to a desired portion of a media asset using a trick-play operation (e.g., scrubbing). Additionally, although dense I-frame renditions (e.g., one frame/second) may provide more previews to a user during a trick-play operation, the larger number of previews may actually make it more difficult for the user to find a desired portion of the media asset.

Accordingly, to solve these problems, systems and methods are provided for generating a personalized set of previews from select frames of a media asset (e.g., screencaps) based on a profile of the user and the importance of the frames to an overall plot to the media asset. For example, in some cases, only a single frame may be selected from each scene of the media asset. Accordingly, when a user performs a scrubbing operation (e.g., or other trick-play), personalized, high resolution, low-density previews (e.g., one preview/scene) may be shown to the user, so that the user to quickly navigate to a desired time point in the media asset. In particular, a media player application receives, while a media asset is being generated for display, a request from a user to move a slider of a progress bar associated with the media asset. The media player application identifies a scene from the media asset that contains a play position indicated by the slider, analyzes the scene to identify a frame that best matches user profile data of the user and importance data for the scene, and generating for display the identified frame overlaid over the displayed media asset. The media player application may repeat the process to display multiple preview images during a trick-play operation.

In some embodiments, the request from the user to move the slider of the progress bar associated with the media asset may be a scrubbing request that changes a play position of the displayed media asset.

In some embodiments, in response to a request to play the media asset from the play position indicated by the slider, the media player application may generate for display the media asset from the beginning of the scene.

In some embodiments, the slider may be a virtual slider, and the request from the user to move the slider of the progress bar associated with the media asset may be a preview scrubbing request that moves the virtual slider without changing a play position of the displayed media asset.

In some embodiments, the media player application, when displaying the identified frame overlaid over the displayed media asset, may generate a screencap of the identified frame, the screencap having a lower resolution than the identified frame, and generate for display the generated screencap overlaid over the displayed media asset at the play position indicated by the slider.

In some embodiments, the media player application, when analyzing the scene to identify the frame, may decode each of a plurality of frames in the scene, the plurality of frames in the scene may include at least one I-frame and at least one P-frame, may compare each of the decoded plurality of frames to the user profile data of the user and the importance data for the scene, and may select, based on a result of the comparing, one of the decoded plurality of frames as the identified frame.

In some embodiments, the media player application, when comparing each of the decoded plurality of frames to the user profile data of the user and the importance data for the scene, may perform image analysis to each of the decoded plurality of frames to identify at least one element in each of the decoded plurality of frames, assign an importance score to each of the decoded plurality of frames based on a result of comparing the identified at least one element in each of the decoded plurality of frames to the importance data for the scene, assign a user preference score to each of the decoded plurality of frames based on a result of comparing the identified at least one element in each of the decoded plurality of frames to the user profile data of the user, and may select one of the decoded plurality of frames as the identified frame based on the assigned importance score and the assigned user preference score.

In some embodiments, the importance data for the scene may include metadata stored in association with the media asset, and the user profile data of the user may include an actor of interest to the user.

In some embodiments, the identified scene may be a first scene and the identified frame may be a first frame. In some embodiments, the media player application may identify a second scene from the media asset that does not contain the play position indicated by the slider, may analyze the second scene to identify a second frame that best matches user profile data of the user and importance data for the scene, and generate for display, while the first frame is being displayed, the identified second frame overlaid over the displayed media asset.

In some embodiments, the media player application may select the identified frame as an identifier for the media asset.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
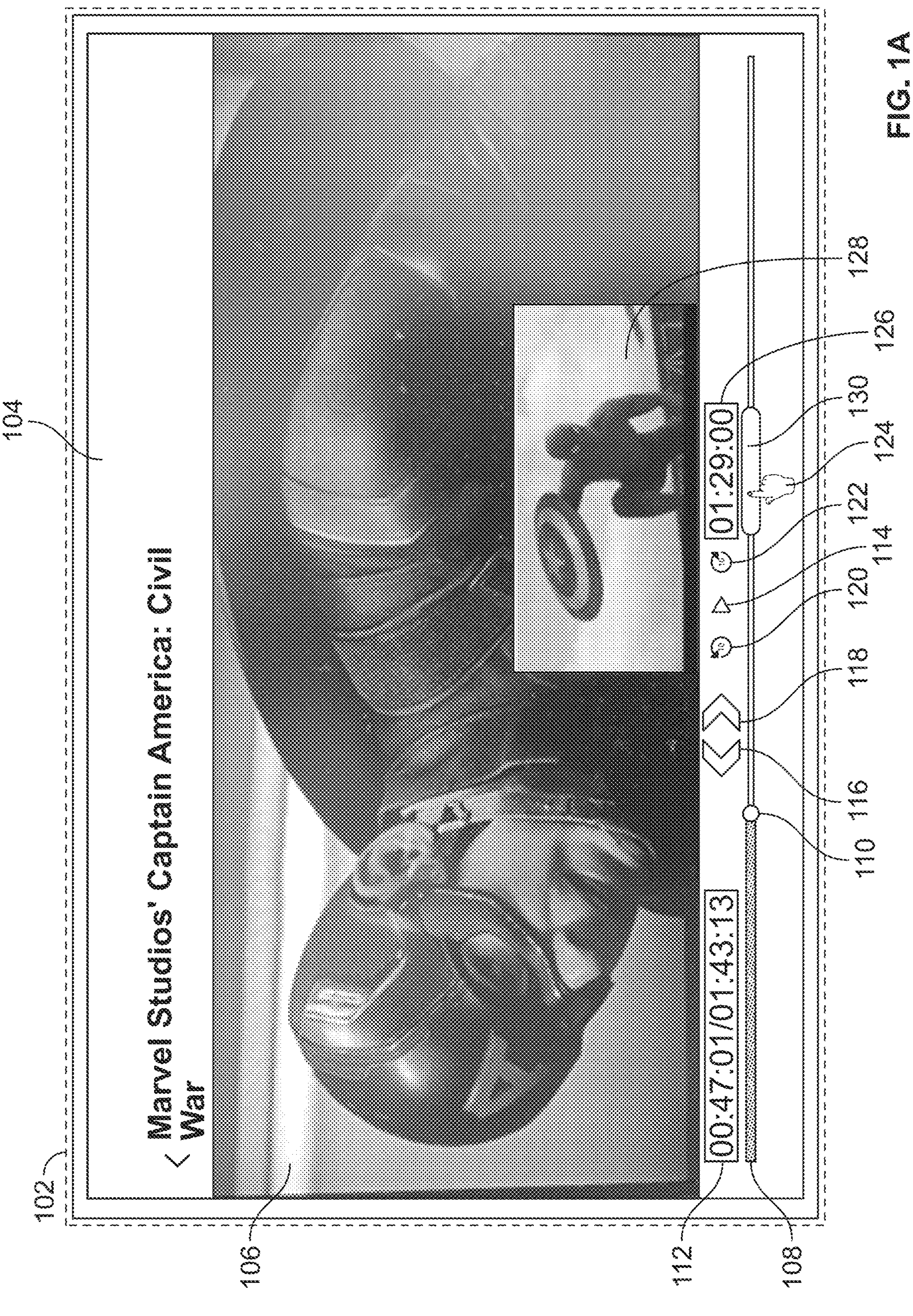
FIGS. 1A and 1B illustrate example media asset scrubbing operation display screens, in accordance with some embodiments of the present disclosure.
Figure 1B:
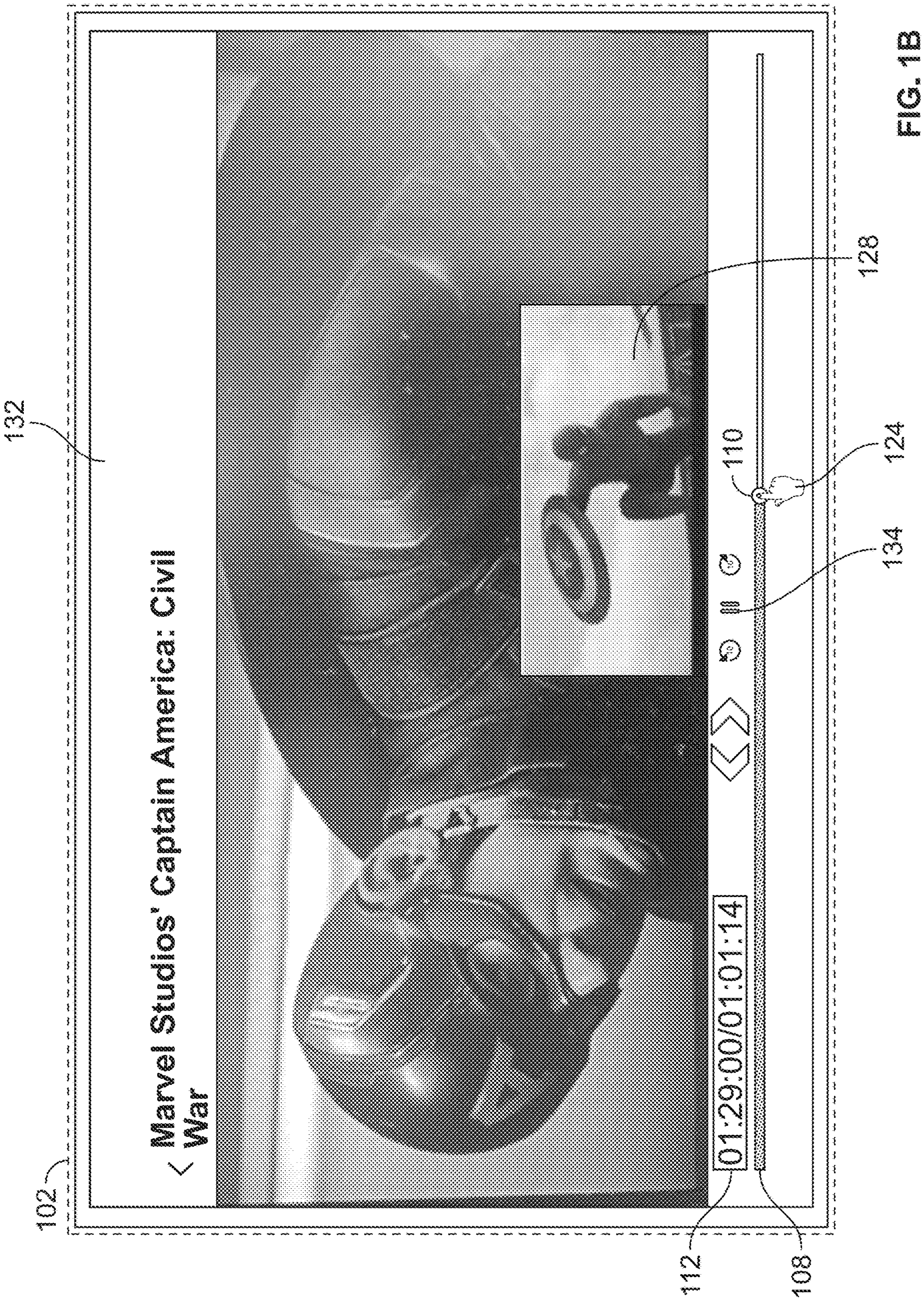

FIGS. 1A and 1B illustrate example media asset scrubbing operation display screens, in accordance with some embodiments of the present disclosure. For example, FIG. 1A illustrates an example media asset scrubbing operation display screen where a preview scrubbing operation is performed, while FIG. 1B illustrates an example media asset scrubbing operation display screen where a skip scrubbing operation is performed.

In FIG. 1A, a media asset scrubbing operation display screen 104 may be displayed on user equipment 102 (e.g., a TV, smartphone, laptop, etc.). The user equipment 102 may comprise control circuitry (described in further detail with respect to at least FIGS. 6 and 7), which executes a media player application to display the media asset scrubbing operation display screen 104. As shown, the media asset scrubbing operation display screen 104 displays a media asset 106 (e.g., Captain America: Civil War), as well as a progress bar 108 and traditional user-selectable buttons and indicators to enable a user to navigate through the media asset 106. For example, as shown, the progress bar 108 includes a slider 110 (e.g., a trick play slider) indicating the current play position of the media asset 106. Indicator 112 may indicate 00:47:01/01:43:13 as the position of the slider 110 in the progress bar (e.g., indicating the time watched/time remaining of the media asset 106). A user may play the media asset 106 (shown as currently paused) by selecting play indicator 114. A user may rewind the media asset 106 by selecting rewind indicator 116 or fast-forward the media asset by selecting fast forward indicator 118. A user may also skip backward or forward a predetermined amount of time (e.g., 10 seconds) by selecting respective skip indicators 120 and 122.

As shown, the user may perform a preview scrubbing operation by hovering a cursor 124 over a desired location in the progress bar 108 (e.g., without moving the slider 110 as described below in FIG. 1B). In response to hovering the cursor 124 over the progress bar 108 as shown (e.g., at 01:29:00 indicated by indicator 126), preview image 128 may be displayed overlaid over the media asset 106 (e.g., a portion of the media asset 106). In contrast to conventional methods of displaying I-frames from I-frame playlists during scrubbing, the preview image 128 may be a screencap of a frame in a scene (of the media asset 106) that contains a play position indicated by the cursor 124, and may be selected based on an importance of the frame to an overall plot to the media asset (e.g., compared to other frames in the scene) and user profile data of the user, as explained in further detail below in FIG. 2. In some embodiments, a scene indicator 130 that corresponds to the scene (e.g., scene 201 of FIG. 2) that the cursor is hovering over may be displayed on the progress bar 108.

In FIG. 1B, a media asset scrubbing operation display screen 132 may be displayed on the user equipment 102. The media asset scrubbing operation display screen 132 may correspond to the media asset scrubbing operation display screen 104 described above in FIG. 1A, except that the user may perform a skip scrubbing operation by selecting the slider 110 with the cursor 124 and dragging the slider 110 to a desired location of the progress bar 108 (e.g., to the same location as described above in FIG. 1A). As shown, during the skip scrubbing operation, the indicator 112 may be updated to indicate 01:29:00/01:01:14 (e.g., the changed position of the slider 110 in the progress bar 108). In response to the user dragging the slider 110 as shown, the preview image 128 may be displayed overlaid over the media asset 106, as described above in FIG. 1A. The media asset 106 may continue to play from the original play position (e.g., 00:47:01/01:43:13) until the user releases the slider 110, at which point the media asset 106 may play from the updated play position. In some embodiments, as described in further detail in FIG. 4, the media asset may play from the beginning of the scene that the slider 110 is released in (e.g., the play position of the slider 110). The user may pause the media asset 106 by selecting pause indicator 134.

Although only a single preview image (e.g., the preview image 128) is shown in the scrubbing operations described above, it should be understood that other preview images may be displayed during the scrubbing operations or any other trick-play operation. For example, one preview image may be displayed for each scene passed during the scrubbing operation. In some embodiments, if the media player application determines that the user will likely not enjoy any of the content in a scene of a media asset, the media player application may refrain from displaying a preview image for that scene, as described in further detail in FIG. 2. In some embodiments, it may be adventitious to display multiple preview images (corresponding to different scenes) at the same time. For example, a preview image may be displayed for both the scene where the slider 110 is currently position, as well as a subsequent scene that has not yet been subject to the trick-play operation, as described in further detail in FIG. 3.

Figure 2:
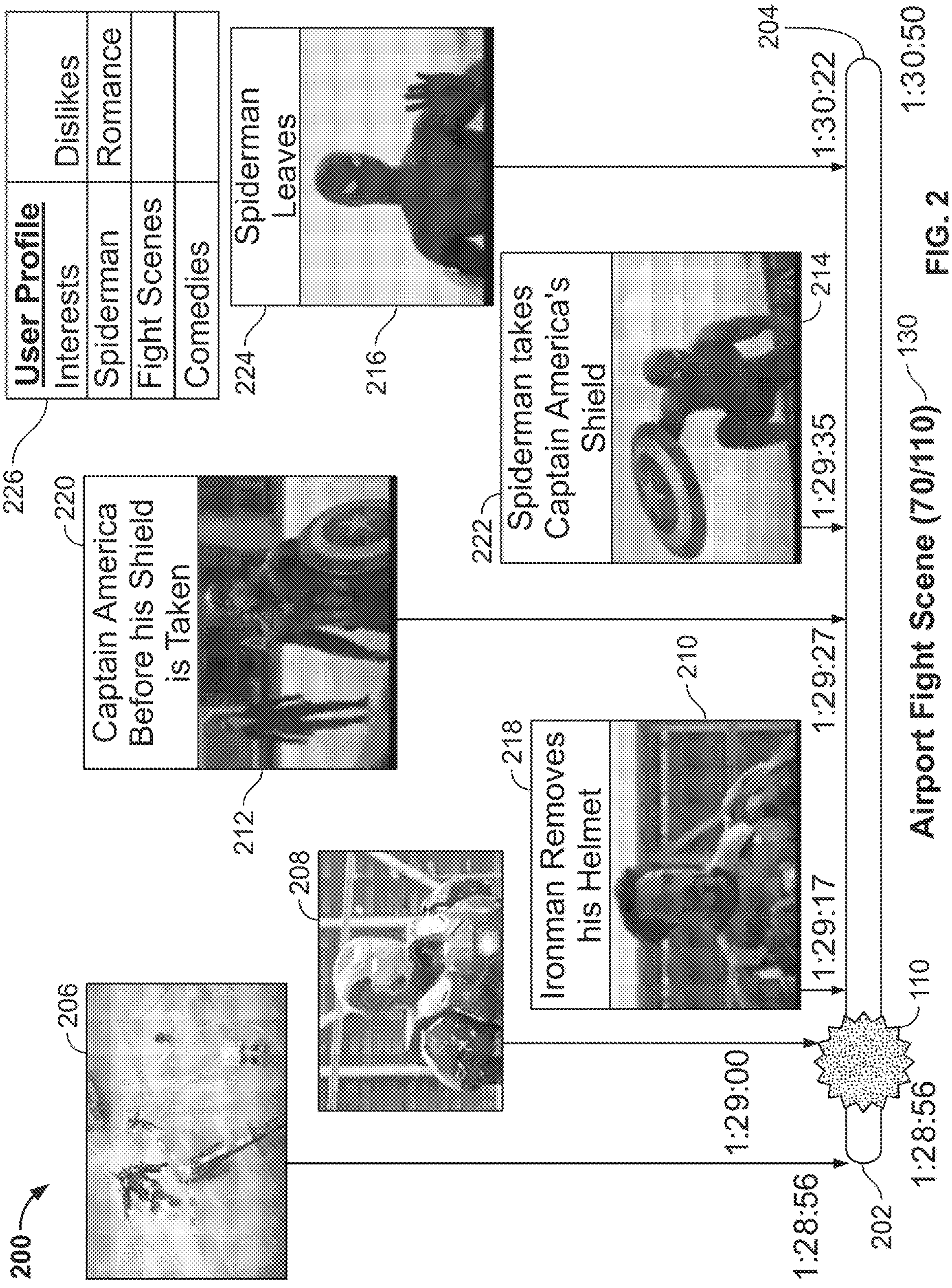
FIG. 2 illustrates an example diagram of a process for selecting a frame from a scene of a media asset to display as a preview image, in accordance with some embodiments of the present disclosure.

FIG. 2 illustrates an example diagram 200 of a process for selecting a frame from a scene of a media asset to display as a preview image, in accordance with some embodiments of the present disclosure. For example, as shown, the diagram 200 shows a process of selecting a frame 214 from the scene 201 that is used for generating the preview image 128 shown in FIGS. 1A and 1B. Although only a selection of a single preview for a single scene is shown, it should be understood that the process described herein may be used to select a frame from each of the plurality of scenes of a media asset (e.g., media asset 106).

In some embodiments, in response to receiving the media asset 106 (e.g., a stream of the media asset 106), the media player application may decode the frames of the media asset 106. For example, the media player application may decode each group of pictures (GOPs) including an I-frame (intra-coded frame) and corresponding P-frames (predictive frames), as well as any B-frames (bi-directional frames). In some embodiments, the media player application may identify the scenes of the media asset 106 (e.g., by identifying scene changes in metadata associated with the media asset 106, by leveraging the scene change detect utilized by the encoder of the media asset 106, or by performing image analysis to determine a change in characters, locations, or genre). In some embodiments, the media player application may utilize the I-frame playlist for analyzing the media asset 106, identifying asset playback start and decoding points, scene changes, etc. For example, in the embodiments shown in FIG. 2, the media player application may identify the scene 201 (e.g., "Airport Fight Scene (70/110)) having a start time 202 at 1:29:56 and an end time 204 at 1:30:50 (e.g., a length of 01:54).

In some embodiments, the media player application may perform image analysis and audio analysis of each of the decoded frames to identify at least one element of interest in each of the decoded frames (e.g., using image analysis functions such as facial recognition, object recognition, edge detection, and character recognition of individual frames of video data, and object tracking across multiple frames of video data, and audio analysis functions such as waveform analysis of audio data). Because each of the frames is decoded, non-I-frames (e.g., P-frames and B-frames) may be identified as important frames. For example, the media player application may perform image analysis and audio analysis to identify certain characters and events in certain frames that correspond to characters or events that are important to a storyline or an overall plot to the media asset 106 (e.g., by comparison to a database of known characters and events), and/or likely to be of interest to a user. For example, the media player application may retrieve a user profile 226 of a user (e.g., the user consuming the media asset 106). The user profile may indicate, e.g., various interests of the user, viewing history of the user, prior search queries of the user, prior interactions with media assets by the user, social media interactions by the user related to media assets, etc. In one example, as shown, the user profile 226 may indicate that the user likes "Spiderman," "Fight scenes," and "comedies," but dislikes "romance." The media player application may also retrieve metadata associated with the media asset 106. The metadata may include information about the media asset 106, such as the description, actors, characters, one or more storylines which are narratives that, along with other narratives, make up the plot of the media asset 106, etc. For example, the metadata may indicate that "Captain America" played by Chris Evens, "Ironman" played by Robert Downey Jr., and "Spiderman" played by Tom Holland star in the Captain America: Civil War (i.e., the media asset 106), and that one of the storylines involves a fight between these characters. The metadata may also include scene-specific metadata, which includes information indicating important characters, events, etc., in each scene and, e.g., associated time points.

Based on the retrieved metadata and the image analysis of the scene 201, the media player application may identify six frames of interest 206, 208, 210, 214, 216, and metadata 218, 220, 222, and 224 associated with some of the frames. For example, as shown, the media player application may identify the frame 208 as the frame corresponding to the play position of the slider 110 (e.g., as discussed above in FIGS. 1A and 1B). The media player application may identify the frame 206 as the first frame in the scene 201. The media player application may identify the frame 210 when "Ironman removes his helmet," the frame 212 showing "Captain America before his shield is taken," the frame 214 when "Spiderman takes Captain America's shield," and frame 216 when "Spiderman leaves." In some embodiments, the media player application may rank the identified frames in a scene based on the relative importance of these frames with respect to a plot of the media asset 106. For example, the media player application may rank the frame 214 as the most important frame in the scene 201, followed by the frame 210, the frame 212, and the frame 216. In some embodiments, the media player application may assign a rank value to each of the identified frames based on their relative importance in the scene 201 as well as the media asset 106 as a whole.

The media asset may select one of the identified frames 206, 208, 210, 214, 216 by comparing the content of each frame to the user profile 226. For example, because the user profile 226 indicates that the user likes Spiderman, the media player application may select the highest-ranked frame depicting Spiderman (e.g., the frame 214). For another user who does not like Spiderman, the media player application may select the highest-ranked frame not depicting Spiderman (e.g., the frame 210). For yet another user who loves goodbyes, the media player application may select the frame depicting a goodbye (e.g., the frame 216). Thus, in this example, the media player application may select a frame that is both important to a plot of the media asset and interesting to the user.

In some embodiments, after selecting the frame 214 for the scene 201, the media player application may generate a preview image (e.g., the preview image 128 shown in FIGS. 1A and 1B) by generating a screencap of the frame 214. In some embodiments, the generated preview image may be a high-resolution image (e.g., compared to the I-frame renditions in the I-frame playlist). In some embodiments, the media player application may include a text overlay of the metadata 222 in the generated preview image 128 (e.g., "Spiderman takes Captain America's shield") so that the user may easily identify a point of interest during a trick-play operation.

In some embodiments, the media player application may save each generated preview image (e.g., for each scene of the media asset 106) to a personalized preview playlist for the user. In some embodiments, the personalized preview playlist may be aligned with the I-frame only playlist such that the selection of a particular preview image allows the media player application to start decoding/displaying content from a specific point in the content item using the I-frame-only playlist, as explained in further detail below in FIG. 4. In some embodiments, the personalized preview playlist may be generated offline (e.g., before the user views the media asset 106) or in real-time after the user begins watching the media asset 106 or performs a trick-play operation. In some embodiments, if the media player application determines that a scene of the media asset 106 is not of interest to the user (e.g., a romance scene based on the user profile 226), the media player application may refrain from generating a preview image for that scene.

In some embodiments, the media player application may generate a trick-play profile for the user, based on the monitored behavior of the user (e.g., trick-play operations) and information in the user profile of the user, and generate preview images based on the trick-play profile. For example, in some embodiments, the trick-play profile of the user include may include metadata about the user's dislikes, metadata associated with previous skips, metadata associated with the user's interests in genres such as action/comedy, preferences for actors/actresses, replays, etc. Such metadata can be used to generate the personalized preview images that predict where the user is likely to fast-forward to during playback. For example, based on previous actions of the user, if the user previously fast-forwarded through content depicting blood (e.g., while watching a documentary) and resumed playback at the next available scene where blood is not shown, then the media player application may select a representative frame from a scene that follows a scene depicting blood for inclusion into the personalized preview playlist. In one embodiment, the metadata about the scenes skipped or fast-forwarded is generated offline by means such as video analysis, speech analysis, and known image processing techniques in order to extract metadata and associate such metadata with the trick-play profile of the user. Similarly, the media player application may rely on structured databases that host granular metadata about video content. As one example, the Video Genome Project (VGP) contains detailed metadata about video items and their relationship to other items. Video Genome Project is a trademark owned by Structured Data Intelligence LLC. Such metadata goes beyond traditional genre/actor/actress metadata and classifies content in specific niches in order to bolster content recommendations. Hence the use of deep-scene metadata may be used to create the personalized preview playlist. In some embodiments, the media player application may also utilize structured databases in the identification of important characters and/or events in certain frames (e.g., during the image and audio analysis of decoded frames discussed above). In some embodiments, the trick-play profile for the user may be stored in or in association with the user profile of the user. In some embodiments, because only a limited number of important preview images may be displayed to a user during a scrubbing operation, it may be advantageous to display more than one preview image at a time, as discussed in further detail below in FIG. 3.

Figure 3:
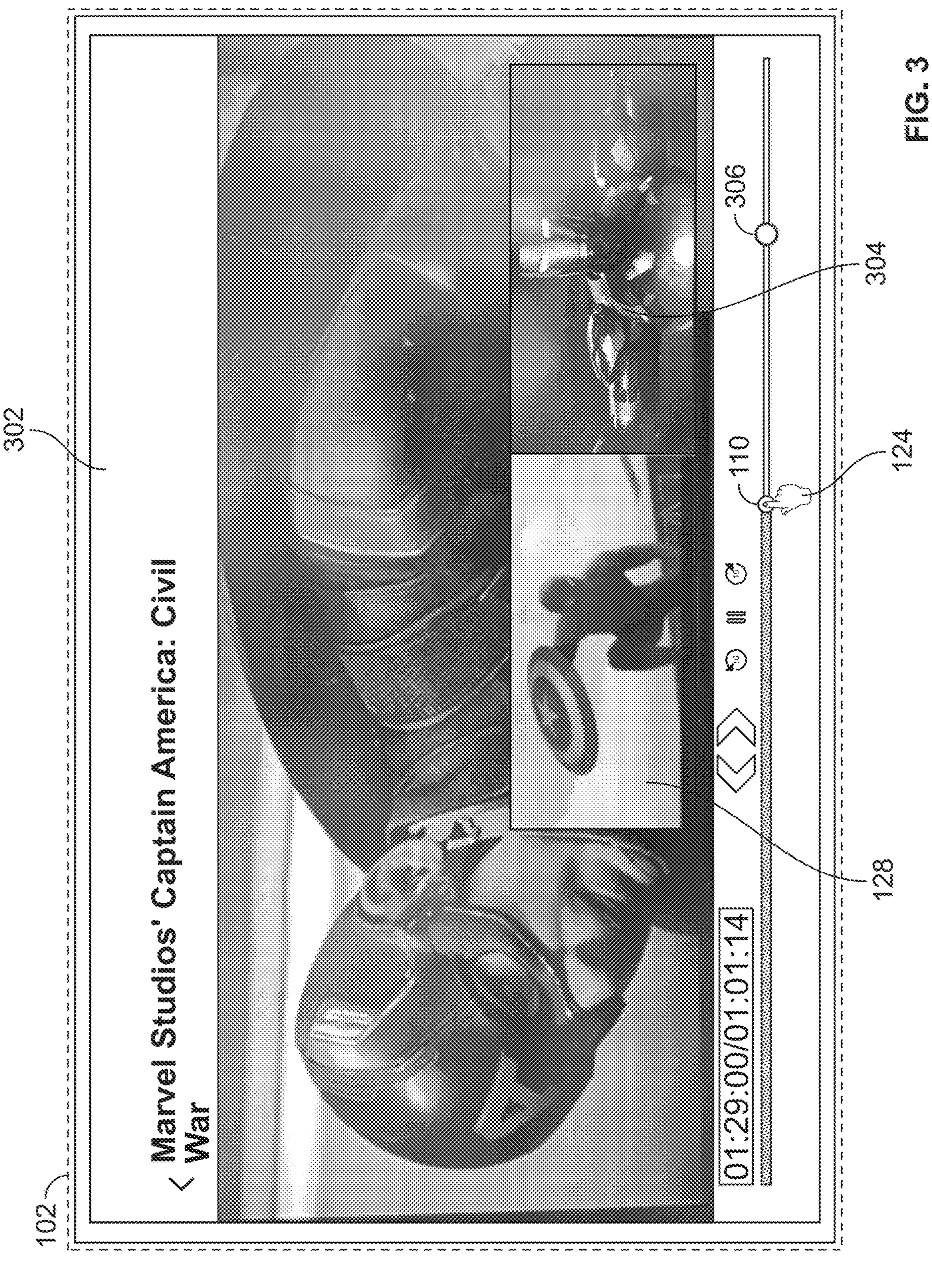
FIG. 3 illustrates an example media asset scrubbing operation display screen for simultaneously displaying multiple preview images while a skip scrubbing operation is performed, in accordance with some embodiments of the present disclosure.

FIG. 3 illustrates an example media asset scrubbing operation display screen 302 for simultaneously displaying multiple preview images while a skip scrubbing operation is performed, in accordance with some embodiments of the present disclosure. In FIG. 3, the media asset scrubbing operation display screen 302 corresponds to the media asset scrubbing operation display screen 132 of FIG. 1B, except that the media asset scrubbing operation display screen 302 displays an additional preview image 304 (e.g., in addition to the preview image 128 displayed based on the current location of the slider 110/cursor 124 during the scrubbing operation) at a subsequent play position 306 that does not correspond to the current location of the slider 110/cursor 124. Thus, the user may more quickly identify a point of interest in the media asset 106.

Figure 4:
FIG. 4 illustrates an example media asset play display screen for resuming playback of a media asset after a scrubbing operation, in accordance with some embodiments of the present disclosure.

FIG. 4 illustrates an example media asset play display screen 402 for resuming playback of a media asset after a scrubbing operation, in accordance with some embodiments of the present disclosure. In response to the user stopping the trick-play operation described in FIG. 1A (e.g., releasing the slider 110 at the play position of 01:29:00), the media player application may resume playback of the media asset 106 at the corresponding play position indicated by the trick-play operation (01:29:00). However, in some embodiments, it may be advantageous to identify the beginning of the scene indicated by the slider 110 and resume playback from the beginning of the scene. For example, as shown in the example media asset play display screen 402, in response to the user stopping the slider 110 at play position 01:29:00, the media player application may resume playback at the beginning of the scene (e.g., at 01:28:56 indicated by the updated indicator 112). To do this, the media player application may, in some embodiments, determine the I-frame in the I-frame playlist that is mapped to the displayed preview image (e.g., an earlier I-frame at the beginning of the scene). Thus, in some embodiments, because the user does not have to perform another trick-play operation to find the beginning of the scene, processing by the media player application may be reduced, while improving user experience. In some embodiments, for scenes longer than a threshold time (e.g., 3 minutes), it may be advantageous to resume playback at the location of the displayed preview image (e.g., 01:29:35 for the preview image). In some embodiments, the media player application may monitor the behavior of the user after playback is resumed and adjust playback thresholds (e.g., if the user always performs an additional trick-play operation to find the frame included in the preview image, the media player application may begin playback from this point).

Figure 5A:
FIGS. 5A and 5B illustrate example media asset recommendation display screens for recommending media assets, in accordance with some embodiments of the present disclosure.
Figure 5B:
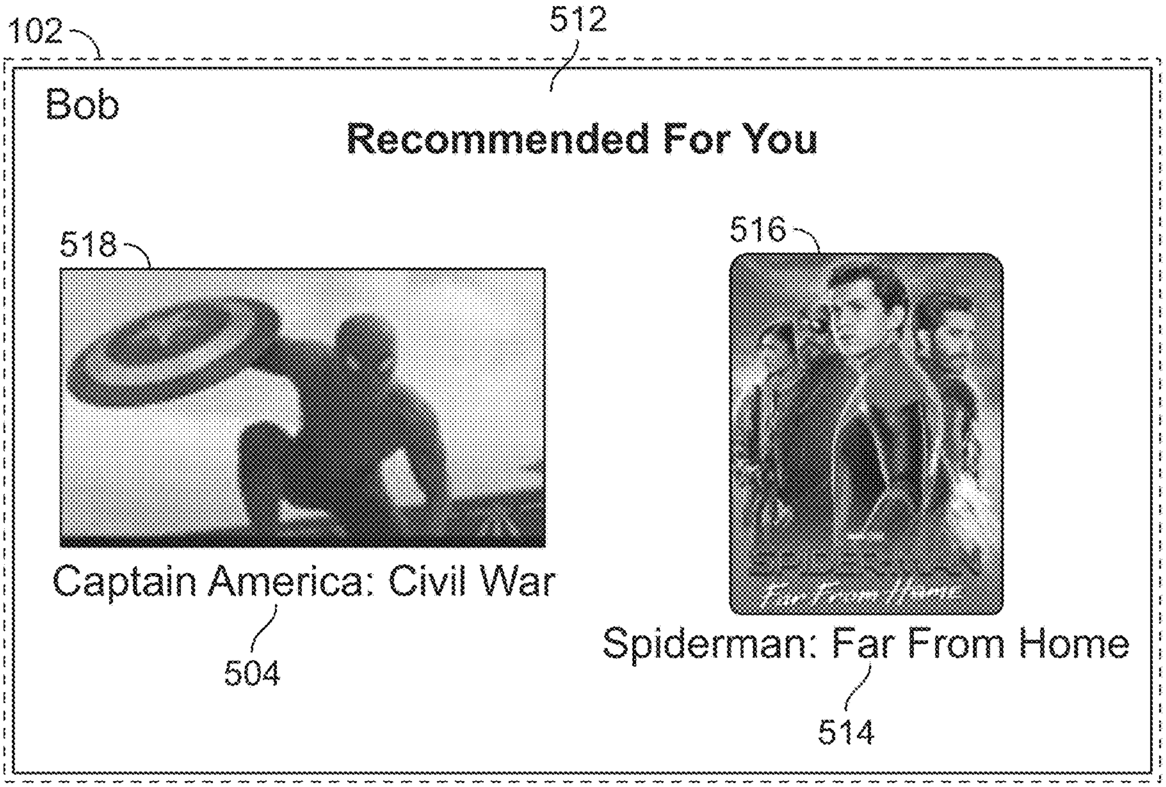

FIGS. 5A and 5B illustrate example media asset recommendation display screens for recommending media assets, in accordance with some embodiments of the present disclosure. For example, FIG. 5A illustrates an initial media asset recommendation display screen 502 displayed on the user equipment 102. As shown, the initial media asset recommendation display screen 502 may display a first indicator 506 for a first media asset recommendation 504 ("Captain America: Civil War) and a second indicator 510 for a second media asset recommendation 508 ("Spiderman"). If, for example, the user consumes the second media asset recommendation 508 ("Spiderman"), the media player application may update the user profile of the user, and display the updated media asset recommendation display screen 512 shown in FIG. 5B.

In FIG. 5B, the updated media asset recommendation display screen 512 may provide a new indicator 516 for a new media asset recommendation 514 ("Spiderman: Far From Home"). Additionally, the media player application may continue to recommend the first media asset recommendation 504 ("Captain America: Civil War), but with an updated indicator 518. For example, based on a determination that the user is interested in Spiderman, the media player application may select one of the preview images generated for the user for Captain America: Civil War (e.g., the preview image 128 depicting Spiderman) as the indicator for the media asset recommendation 504. Additionally, media asset identifiers that a user has started watching (e.g., displayed on a continue watching page) may be replaced with the personalized preview image closest to the point where the user stopped watching the media asset. However, these are only examples, and the personalized preview images may be used in any suitable manner to personalize the experience of the user.

Figure 6:
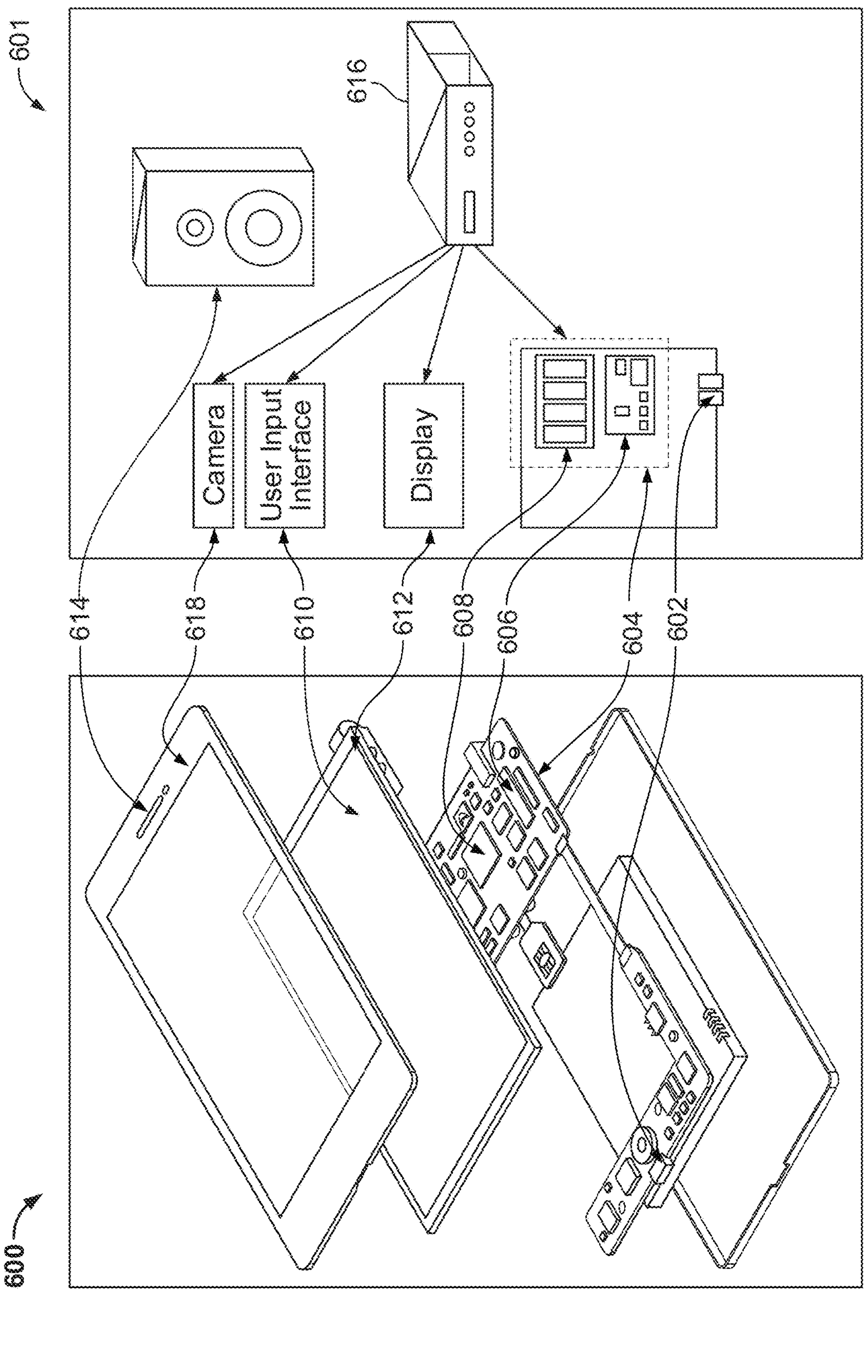
FIGS. 6-7 describe exemplary devices, systems, servers, and related hardware for generating a personalized set of previews from select frames of a media asset and selectively displaying previews during a trick-play operation, in accordance with some embodiments of the present disclosure.
Figure 7:
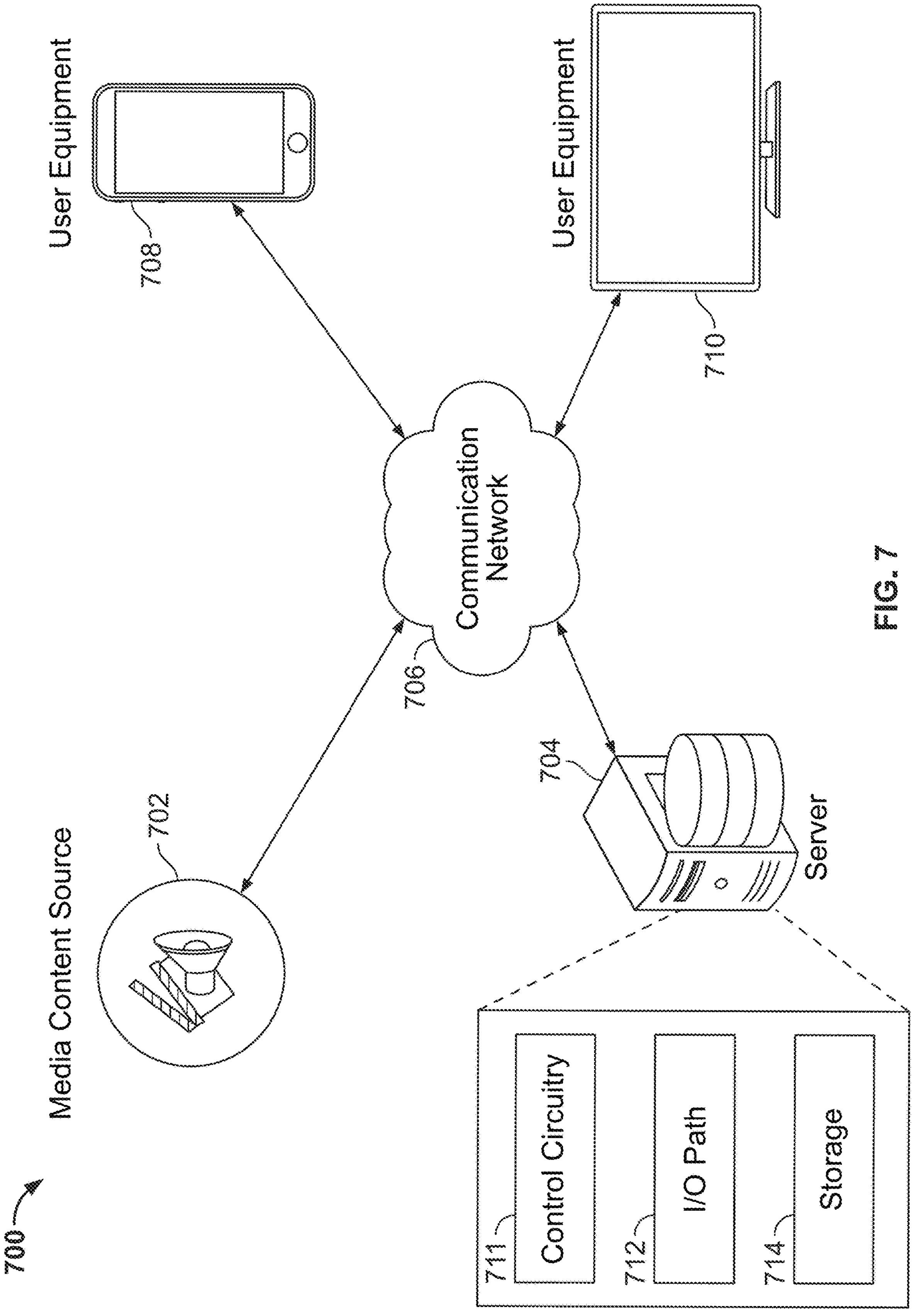

FIGS. 6-7 describe exemplary devices, systems, servers, and related hardware for generating a personalized set of previews from select frames of a media asset and selectively displaying previews during a trick-play operation, in accordance with some embodiments of the present disclosure. FIG. 6 shows generalized embodiments of illustrative user equipment devices 600 and 601. For example, user equipment device 600 may be a tablet or smartphone device. In another example, user equipment system 601 may be a user television equipment system (e.g., the user equipment 102). In another example, the user equipment system 601 may be a stereo or other audio playback device. The user television equipment system 601 may include a set-top box 616. The set-top box 616 may be communicatively connected to a camera 618, a speaker 614, and a display 612. In some embodiments, the camera may detect users viewing the display. In some embodiments, the display 612 may be a television display or a computer display. In some embodiments, the set-top box 616 may be communicatively connected to a user input interface 610. In some embodiments, the user input interface 610 may be a remote control device. The set-top box 616 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 7. Each one of the user equipment device 600 and the user equipment system 601 may receive content and data via input/output (I/O) path 602. The I/O path 602 may provide content (e.g., broadcast programming, on-demand programming, Internet content, content available over a local area network (LAN) or wide area network (WAN), and/or other content) and data to control circuitry 604, which includes processing circuitry 606 and a storage 608. The control circuitry 604 may be used to send and receive commands, requests, and other suitable data using the I/O path 602. The I/O path 602 may connect the control circuitry 604 (and specifically the processing circuitry 606) to one or more communications paths (described below). I/O functions may be provided by one or more of these communications paths, but are shown as a single path in FIG. 6 to avoid overcomplicating the drawing.

The control circuitry 604 may be based on any suitable processing circuitry such as the processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 604 executes instructions for a media player application stored in memory (i.e., the storage 608). Specifically, the control circuitry 604 may be instructed by the media player application to perform the functions discussed above and below. In some implementations, any action performed by the control circuitry 604 may be based on instructions received from the media player application.

In client/server-based embodiments, the control circuitry 604 may include communications circuitry suitable for communicating with a media player application server or other networks or servers. The instructions for carrying out the above-mentioned functionality may be stored on a server (which is described in more detail in connection with FIG. 7). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as the storage 608 that is part of the control circuitry 604. As referred to herein, the phrase "electronic storage device" or "storage device" should be understood to mean any device for storing electronic data, computer software, or firmware, such as random-access memory, read-only memory, hard drives, optical drives, digital video recorders (DVRs, sometimes called personal video recorders, or PVRs), solid state devices, quantum storage devices, gaming consoles, gaming media, or any other suitable fixed or removable storage devices, and/or any combination of the same. The storage 608 may be used to store various types of content described herein as well as media player application data described above. For example, the storage 608 may be used to store the user profile described herein Nonvolatile memory may also be used (e.g., to launch a boot-up routine and other instructions). Cloud-based storage, described in relation to FIG. 7, may be used to supplement the storage 608 or instead of the storage 608.

The control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. The control circuitry 604 may also include scaler circuitry for upconverting and downconverting content into the preferred output format of the user equipment 600. The circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If the storage 608 is provided as a separate device from the user equipment device 600, the tuning and encoding circuitry (including multiple tuners) may be associated with the storage 608.

A user may send instructions to the control circuitry 604 using the user input interface 610. The user input interface 610 may be any suitable user interface, such as a remote control, mouse, trackball, keypad, keyboard, touchscreen, touchpad, stylus input, joystick, voice recognition interface, or other user input interfaces. The display 612 may be provided as a stand-alone device or integrated with other elements of each one of the user equipment device 600 and the user equipment system 601. For example, the display 612 may be a touchscreen or touch-sensitive display. In such circumstances, the user input interface 610 may be integrated with or combined with display 612. The display 612 may be one or more of a monitor, a television, a display for a mobile device, or any other type of display. A video card or graphics card may generate the output to the display 612. The video card may be any processing circuitry described above in relation to the control circuitry 604. The video card may be integrated with the control circuitry 604. Speakers 614 may be provided as integrated with other elements of each one of the user equipment device 600 and the user equipment system 601 or may be stand-alone units. The audio component of videos and other content displayed on the display 612 may be played through the speakers 614. In some embodiments, the audio may be distributed to a receiver (not shown), which processes and outputs the audio via speakers 614.

The media player application may be implemented using any suitable architecture. For example, it may be a stand-alone application wholly implemented on each one of the user equipment device 600 and the user equipment system 601. In such an approach, instructions of the application are stored locally (e.g., in the storage 608), and data for use by the application is downloaded on a periodic basis (e.g., from an out-of-band feed, from an Internet resource, or using another suitable approach). The control circuitry 604 may retrieve instructions of the application from the storage 608 and process the instructions to recommend media content items as discussed. Based on the processed instructions, the control circuitry 604 may determine what action to perform when input is received from the user input interface 610. For example, movement of a cursor on a display up/down may be indicated by the processed instructions when the user input interface 610 indicates that an up/down button was selected.

In some embodiments, the media player application is a client/server-based application. Data for use by a thick or thin client implemented on each one of the user equipment device 600 and the user equipment system 601 is retrieved on demand by issuing requests to a server remote to each one of the user equipment device 600 and the user equipment system 601. In one example of a client/server-based guidance application, the control circuitry 604 runs a web browser that interprets web pages provided by a remote server. For example, the remote server may store the instructions for the application in a storage device. The remote server may process the stored instructions using circuitry (e.g., the control circuitry 604) and generate a personalized set of previews from select frames of a media asset and selectively display previews during trick-play operations as discussed.

In some embodiments, the media player application is downloaded and interpreted or otherwise run by an interpreter or virtual machine (run by the control circuitry 604). In some embodiments, the media player application may be encoded in the ETV Binary Interchange Format (EBIF), received by the control circuitry 604 as part of a suitable feed, and interpreted by a user agent running on the control circuitry 604. For example, the media player application may be an EBIF application. In some embodiments, the media player application may be defined by a series of JAVA-based files that are received and run by a local virtual machine or other suitable middleware executed by control circuitry 604. In some of such embodiments (e.g., those employing MPEG-2 or other digital media encoding schemes), the media player application may be, for example, encoded and transmitted in an MPEG-2 object carousel with the MPEG audio and video packets of a program.

FIG. 7 is a diagram of an illustrative media system, in accordance with some embodiments of the disclosure. User equipment devices 708 and 710 (such as the user equipment 102) may be coupled to communication network 706. The communication network 706 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment devices, these devices may communicate directly with each other via communications paths such as short-range communication paths, point-to-point communications paths, such as USB cables, IEEE 1394 cables, wireless paths (e.g., Bluetooth, infrared, IEEE 802-11x, etc.), or other short-range communication via wired or wireless paths. The user equipment devices may also communicate with each other directly through an indirect path via the communication network 706.

The system 700 includes a media content source 702 and a server 704. Communications with the media content source 702 and the server 704 may be exchanged over one or more communications paths but are shown as a single path in FIG. 7 to avoid overcomplicating the drawing. In addition, there may be more than one of each of the media content source 702 and the server 704, but only one of each is shown in FIG. 7 to avoid overcomplicating the drawing. If desired, the media content source 702 and the server 704 may be integrated as one source device.

In some embodiments, the server 704 may include control circuitry 711 and a storage 714 (e.g., RAM, ROM, hard disk, removable disk, etc.). The server 704 may also include an input/output path 712. The I/O path 712 may provide device information, or other data, over a local area network (LAN) or wide area network (WAN), and/or other content and data to the control circuitry 711, which includes processing circuitry, and the storage 714. The control circuitry 711 may be used to send and receive commands, requests, and other suitable data using the I/O path 712. The I/O path 712 may connect the control circuitry 711 (and specifically processing circuitry) to one or more communications paths.

The control circuitry 711 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 711 executes instructions for an emulation system application stored in memory (e.g., the storage 714). Memory may be an electronic storage device provided as the storage 714 that is part of the control circuitry 711.

The server 704 may retrieve guidance data from media content source 702, process the data as will be described in detail below, and forward the data to the user equipment devices 708 and 710. The media content source 702 may include one or more types of content distribution equipment including an audio distribution facility, a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 702 may be the originator of content (e.g., a television broadcaster, a Webcast provider, etc.) or may not be the originator of content (e.g., an on-demand content provider, an Internet provider of content of broadcast programs for downloading, etc.). The media content source 702 may include cable sources, satellite providers, on-demand providers, Internet providers, over-the-top content providers, or other providers of content. The media content source 702 may also include a remote media server used to store different types of content (including video content selected by a user), in a location remote from any of the client devices.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 704), which may be located centrally or at distributed locations, that provide cloud-based services to various types of users and devices connected via a network (such as the Internet) via communication network 706. In such embodiments, user equipment devices may operate in a peer-to-peer manner without communicating with a central server.

Figure 8:
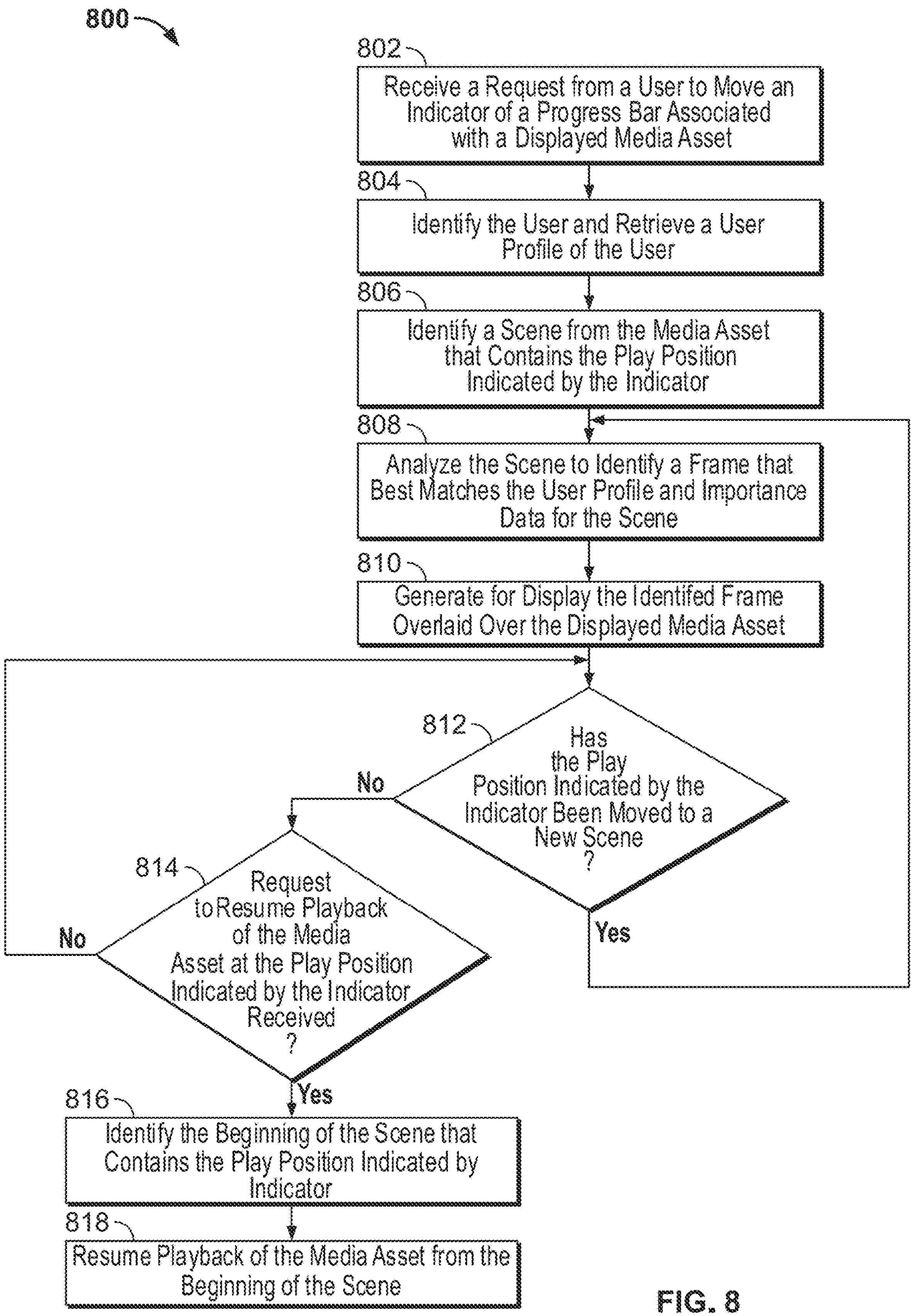
FIG. 8 depicts a flowchart of illustrative steps of a process for generating a preview image of a frame of a media asset selected based on a profile of the user and an importance of the frames to an overall plot to the media asset and displaying the preview image during a trick-play operation, in accordance with some embodiments of the present disclosure.

FIG. 8 depicts a flowchart of illustrative steps of a process 800 for generating a preview image of a frame of a media asset selected based on a profile of the user and an importance of the frames to an overall plot to the media asset and displaying the preview image during a trick-play operation, in accordance with some embodiments of the present disclosure.

The process 800 may be executed by the control circuitry 604 (e.g., in a manner instructed to the control circuitry 604 by the media player application). The control circuitry 604 may be part of user equipment (e.g., a device that may have any or all of the functionality of the user equipment devices 708 and 710), or of a remote server separated from the user equipment by way of the communication network 706, or distributed over a combination of both. It should be noted that the process 800, or any step thereof, could be performed on, or provided by, any of the devices described above in FIGS. 1A, 1B, 3, 4, 5A, and 5B.

The process 800 begins at step 802 when the media player application (e.g., via the control circuitry 604) receives a request from a user to move a slider of a progress bar associated with a displayed media asset. For example, the request may be a request for a trick-play operation such as a scrubbing operation.

At 804, the media player application (e.g., via the control circuitry 604) identifies the user and retrieves a user profile of the user. For example, the control circuitry 604 may identify the user using various techniques such as facial recognition techniques, voice recognition techniques, a profile currently logged into the user equipment used to view the media asset, information obtained from a device associated with the user, etc. The user profile of the user may indicate, e.g., various interests of the user, viewing history of the user, prior search queries of the user, prior interactions with media assets by the user, social media interactions by the user related to media assets, etc.

At 806, the media player application (e.g., via the control circuitry 604) identifies a scene from the media asset that contains the play position indicated by the slider. For example, the control circuitry 604 may identify the start and end times of scenes in the media assets and determine which scene the play position is currently located in (e.g., during the trick play operation).

Figure 9:
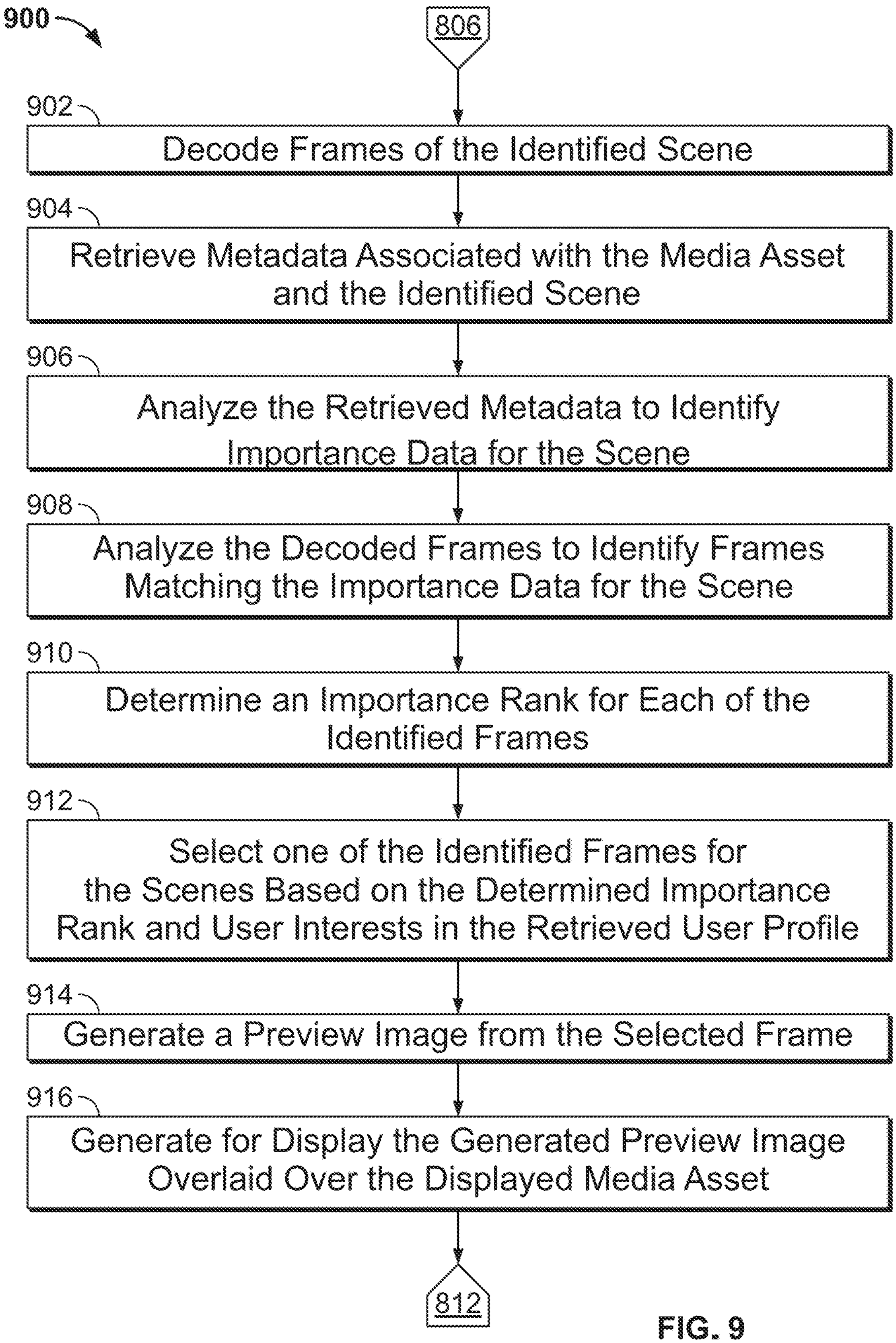
FIG. 9 depicts a flowchart of illustrative steps of a process for identifying and displaying a frame that best matches the user profile as a preview image, among frames of the scene, in accordance with some embodiments of the present disclosure.

At 808, the media player application (e.g., via the control circuitry 604) analyzes the scene to identify a frame that best matches the user profile and importance data for the scene, as explained in further detail in FIG. 9.

At 810, the media player application (e.g., via the control circuitry 604) generates for display the identified frame overlaid over the displayed media asset. For example, as explained in further detail in FIG. 9, the control circuitry may generate for display a thumbnail preview image at the play position indicated by the slider.

At 812, the media player application (e.g., via the control circuitry 604) determines if the play position indicated by the slider has been moved to a new scene. For example, the control circuitry 604 has continued the trick-play operation (e.g., continued scrubbing). If the control circuitry 604 determines that the play position indicated by the slider has been moved to a new scene ("Yes" at step 812), the process

800 returns to step 808 (e.g., to identify and display the next preview image). Otherwise ("No" at step 812), the process 800 proceeds to step 814.

At 814, the media player application (e.g., via the control circuitry 604) determines if a request to resume playback of the media asset at the play position indicated by the slider has been received. For example, the control circuitry 604 determines if the user has stopped the trick-play to resume playback. If the control circuitry 604 determines that a request resume playback of the media asset has been received ("Yes" at step 814), the process 800 proceeds to step 816. Otherwise ("No" at step 814), the process 800 returns to step 812 and monitors the play position indicated by the slider.

At 816, the media player application (e.g., via the control circuitry 604) identifies the beginning of the scene that contains the play position indicated by the slider.

At 818, the media player application (e.g., via the control circuitry 604) resumes playback of the media asset from the beginning of the scene.

FIG. 9 depicts a flowchart of illustrative steps of a process 900 for identifying and displaying a frame that best matches the user profile as a preview image, among frames of the scene, in accordance with some embodiments of the present disclosure. The process 900 is one embodiment of a method for performing steps 808 and 810 of FIG. 8 and begins after step 806. At 902, the media player application (e.g., via the control circuitry 604) decodes frames of the identified scene (e.g., including any P-frames or B-frames).

At 904, the media player application (e.g., via the control circuitry 604) retrieves metadata associated with the media asset. The metadata may include information about the media asset (e.g., including one or more storylines that make up the plot of the media asset) and scene specific metadata which includes information indicating important characters, events, etc. in the identified scene.

At 906, the media player application (e.g., via the control circuitry 604) analyzes the retrieved metadata to identify importance data for the scene (e.g., indicating the rank and importance of events in the scene).

At 908, the media player application (e.g., via the control circuitry 604) analyzes the decoded frames to identify frames matching the importance data for the scene. For example, the control circuitry 604 identifies frames depicting the important events in the scene.

At 910, the media player application (e.g., via the control circuitry 604) determines an importance data for each of the identified frames. For example, the control circuitry 604 may rank the identified frames from most important to least important and/or assign an importance value representing the importance of the identified frames within both the scene and the media asset.

At 912, the media player application (e.g., via the control circuitry 604) selects one of the identified frames based the determined importance rank and user interests in the retrieved user profile. For example, in one embodiment the control circuitry 604 weights the determined importance rank and matching user interests to determine a composite importance score for each of the identified frames and selects the frame with the highest score.

At 914, the media player application (e.g., via the control circuitry 604) generates a preview image from the selected frame. For example, the control circuitry 604 may generate a preview image by generating a screencap of the frame. In some embodiments, the generated preview image may have a larger resolution than the I-frame renditions in the I-frame playlist.

At 916, the media player application (e.g., via the control circuitry 604) generates for display the generated preview image overlaid over the displayed media asset.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, step 816 may be omitted and playback of the media asset may be started from the position of the slider of the location of the displayed preview. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method, comprising:

selecting a criteria based at least in part on data from a viewer profile;

determining a first plurality of importance scores for a first plurality of frames of a media asset, wherein:

the first plurality of importance scores is based at least in part on the criteria, and at least in part on importance data of a first scene to which the first plurality of frames belong, and the media asset is being provided to a device associated with the viewer profile, and is displayed at the device;

receiving a first scrub request to perform a first scrubbing operation in relation to the media asset, wherein the first scrub request is associated with the first scene; and based at least in part on receiving the first scrub request:

identifying a first frame, of the first plurality of frames of the first scene, based at least in part on an importance score, of the first plurality of importance scores, for the first frame; and providing, to the device, the identified first frame as a first preview overlaid over the displayed media asset, in relation to the first scrubbing operation;

determining a second plurality of importance scores for a second plurality of frames of the media asset, based at least in part on the criteria, and at least in part on importance data of a second scene to which the second plurality of frames belong;

receiving a second scrub request to perform a second scrubbing operation in relation to the media asset, wherein the second scrub request is associated with the second scene; and based at least in part on the second plurality of importance scores, refraining from providing any of the second plurality of frames as a second preview, in relation to the second scrubbing operation.

2. The method of claim 1, further comprising:

determining a plurality of ranks for the first plurality of frames, respectively, of the media asset, based at least in part on a respective importance of each of the first plurality of frames to the first scene;

wherein identifying the first frame of the first plurality of frames is further based at least in part on the plurality of ranks.

3. The method of claim 1, wherein the first scene of the media asset associated with the first scrubbing operation is different from a third scene of the media asset being provided to the device when the first scrub request is received.

4. The method of claim 1, wherein:

the first scene of the media asset has a start time and an end time different than a start time and end time of the media asset;

a progress bar indicates the start time and end time of the media asset;

a slider on the progress bar indicates a play position of the media asset; and the method further comprises generating, for display, an indicator on a portion of the progress bar that indicates the start time and end time of the first scene of the media asset.

5. The method of claim 1, further comprising determining, using metadata of the media asset, the first scene of the media asset corresponding to the first scrub request.

6. The method of claim 2, wherein:

identifying the first frame comprises determining that the first frame has the highest rank of the plurality of ranks for the first plurality of frames of the first scene.

7. The method of claim 1, wherein the criteria comprises indications of at least one topic that a viewer corresponding to the viewer profile likes and at least one topic that the viewer dislikes.

8. The method of claim 1, wherein:

the media asset comprises metadata that indicates content of each frame; and determining the first plurality of importance scores for each of the first plurality of frames is further based at least in part on the metadata.

9. The method of claim 1, wherein:

a slider on a progress bar indicates a play position of the media asset; and receiving the first scrub request comprises receiving an interaction with the progress bar without receiving an interaction with the slider.

10. The method of claim 1, wherein:

a slider on a progress bar indicates a play position of the media asset;

receiving the first scrub request comprises receiving an interaction with the slider to cause the slider to move to another position on the progress bar; and the interaction with the slider causes the slider to move without changing the play position of the media asset.

11. A system comprising:

a memory storing instructions; and control circuitry configured to execute the instructions stored in the memory to:

select criteria based at least in part on data from a viewer profile;

determine a first plurality of importance scores for a first plurality of frames of a media asset, wherein:

the first plurality of importance scores is based at least in part on the criteria, and at least in part on importance data of a first scene to which the first plurality of first frames belong; and the media asset is being provided to a device associated with the viewer profile, and is displayed at the device;

receive a first scrub request to perform a first scrubbing operation in relation to the media asset, wherein the first scrub request is associated with the first scene; and based at least in part on receiving the first scrub request:

identify a first frame, of the first plurality of frames of the first scene, based at least in part on an importance score, of the first plurality of importance scores, for the first frame; and provide, to the device, the identified first frame as a first preview overlaid over the displayed media asset, in relation to the first scrubbing operation;

determine a second plurality of importance scores for a second plurality of frames of the media asset, based at least in part on the criteria, and at least in part on importance data of a second scene to which the second plurality of frames belong;

receive a second scrub request to perform a second scrubbing operation in relation to the media asset, wherein the second scrub request is associated with the second scene; and based at least in part on the second plurality of importance scores, refrain from providing any of the second plurality of frames as a second preview, in relation to the second scrubbing operation.

12. The system of claim 11, wherein the control circuitry is further configured to:

determine a plurality of ranks for the first plurality of frames, respectively, of the media asset, based at least in part on a respective importance of each of the first plurality of frames to the first scene; and wherein identifying the first frame of the first plurality of frames is further based at least in part on the plurality of ranks.

13. The system of claim 11, wherein the first scene of the media asset associated with the first scrubbing operation is different from a third scene of the media asset being provided to the device when the first scrub request is received.

14. The system of claim 11, wherein:

the first scene of the media asset has a start time and an end time different than a start time and end time of the media asset;

a progress bar indicates the start time and end time of the media asset;

a slider on the progress bar indicates a play position of the media asset; and the control circuitry is further configured to generate, for display, an indicator on a portion of the progress bar that indicates the start time and end time of the first scene of the media asset.

15. The system of claim 12, wherein:

the control circuitry is further configured to identify the first frame by determining that the first frame has the highest rank of the plurality of ranks for the first plurality of frames of the first scene.

16. The system of claim 11, wherein:

the media asset comprises metadata that indicates content of each frame; and the control circuitry is further configured to determine the first plurality of importance scores for each of the first plurality of frames further based at least in part on the metadata.

17. The system of claim 11, wherein:

a slider on a progress bar indicates a play position of the media asset; and receiving the first scrub request comprises receiving an interaction with the progress bar without receiving an interaction with the slider.

18. The system of claim 11, wherein:

a slider on a progress bar indicates a play position of the media asset;

receiving the first scrub request comprises receiving an interaction with the slider to cause the slider to move to another position on the progress bar; and the interaction with the slider causes the slider to move without changing the play position of the media asset.

19. The method of claim 1, wherein refraining from providing any of the second plurality of frames as a second preview, in relation to the second scrubbing operation, is performed based at least in part on determining that none of the second plurality of frames are likely to be of interest to a user of the viewer profile.

20. The method of claim 1, further based at least in part on receiving the first scrub request, identifying a frame from a third scene different from the first scene and the second scene, wherein the third scene is not associated with the first scrubbing operation, and the method further comprises providing, for simultaneous display at the device:

the first preview overlaid over the displayed media asset; and a third preview for the frame of the third scene overlaid over the displayed media asset.

* * * * *